(12) United States Patent
Yang et al.

(10) Patent No.: US 9,258,733 B2
(45) Date of Patent: Feb. 9, 2016

(54) NETWORK CONGESTION CONTROL

(71) Applicant: Verizon Patent and Licensing Inc., Arlington, VA (US)

(72) Inventors: Jin Yang, Orinda, CA (US); Yee Sin Chan, San Jose, CA (US); Kent W. Hughes, Oakland, CA (US); Shankar Venkatraman, San Jose, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 14/312,790

(22) Filed: Jun. 24, 2014

(65) Prior Publication Data
US 2015/0373577 A1   Dec. 24, 2015

(51) Int. Cl.
| | |
|---|---|
| *H04W 4/00* | (2009.01) |
| *H04W 28/02* | (2009.01) |
| *H04W 72/08* | (2009.01) |
| *H04W 48/08* | (2009.01) |
| *H04W 60/00* | (2009.01) |
| *H04W 72/04* | (2009.01) |
| *H04W 12/06* | (2009.01) |
| *H04W 88/02* | (2009.01) |

(52) U.S. Cl.
CPC .......... *H04W 28/0236* (2013.01); *H04W 12/06* (2013.01); *H04W 48/08* (2013.01); *H04W 60/00* (2013.01); *H04W 72/0413* (2013.01); *H04W 72/085* (2013.01); *H04W 88/02* (2013.01)

(58) Field of Classification Search
CPC ................... H04W 28/0236; H04W 72/0413; H04W 88/02; H04W 48/08; H04W 72/085; H04W 12/06; H04W 60/00
See application file for complete search history.

(56) References Cited

U.S. PATENT DOCUMENTS

| | | | |
|---|---|---|---|
| 8,327,432 B2 * | 12/2012 | Wong et al. ...................... 726/12 |
| 2006/0159016 A1 * | 7/2006 | Sagfors et al. ................ 370/230 |
| 2011/0217982 A1 * | 9/2011 | Zhao ............................. 455/437 |
| 2013/0301559 A1 * | 11/2013 | Zakrzewski .................. 370/329 |
| 2014/0022904 A1 * | 1/2014 | Ahmad et al. ................ 370/235 |
| 2015/0156808 A1 * | 6/2015 | Brantner et al. ............. 455/41.2 |

* cited by examiner

*Primary Examiner* — Ajit Patel

(57) ABSTRACT

A method, a device, and a non-transitory storage medium to obtain a traffic volume value that indicates a volume of traffic to and/or from a radio node, a value that indicates a class of the radio node, or a received signal strength value that indicates a received signal strength of a macro signal received by the radio node; calculate a delay time value based on traffic volume value, the value that indicates the class, or the received signal strength value; and transmit the delay time value to the radio node, wherein the delay time value indicates a time period to wait, by the radio node, before attempting to authenticate and register with one or more network devices.

25 Claims, 14 Drawing Sheets

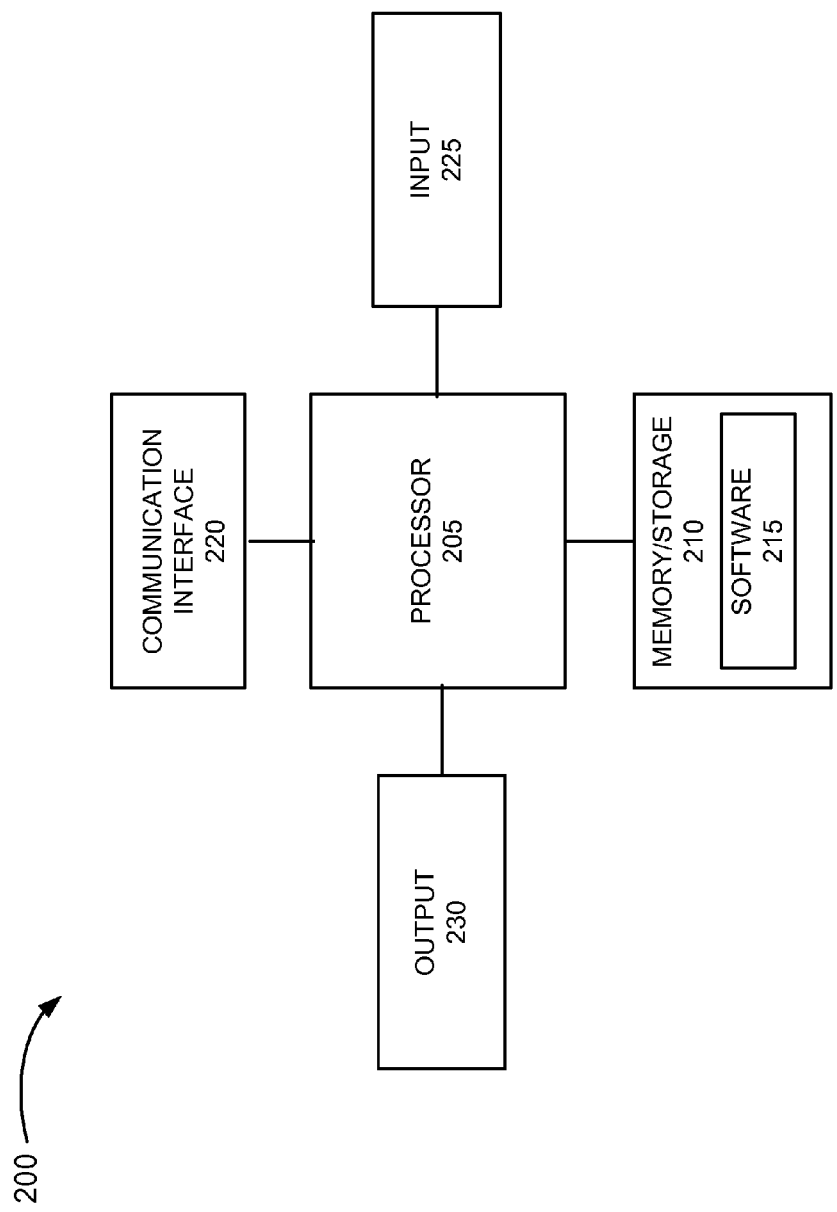

NETWORK CONGESTION CONTROL

BACKGROUND

As wireless networks evolve toward heterogeneous networks, femtocells are becoming popular. It is expected that tens of thousands of femtocells are going to be deployed in the next few years. Additionally, the deployment of other types of wireless nodes, such as picocells and microcells are popular.

BRIEF DESCRIPTION OF THE DRAWINGS

FIG. 2 is a diagram illustrating exemplary components of a device that may correspond to one or more devices depicted in the previous figures;

DETAILED DESCRIPTION OF PREFERRED EMBODIMENTS

Figure 1A:
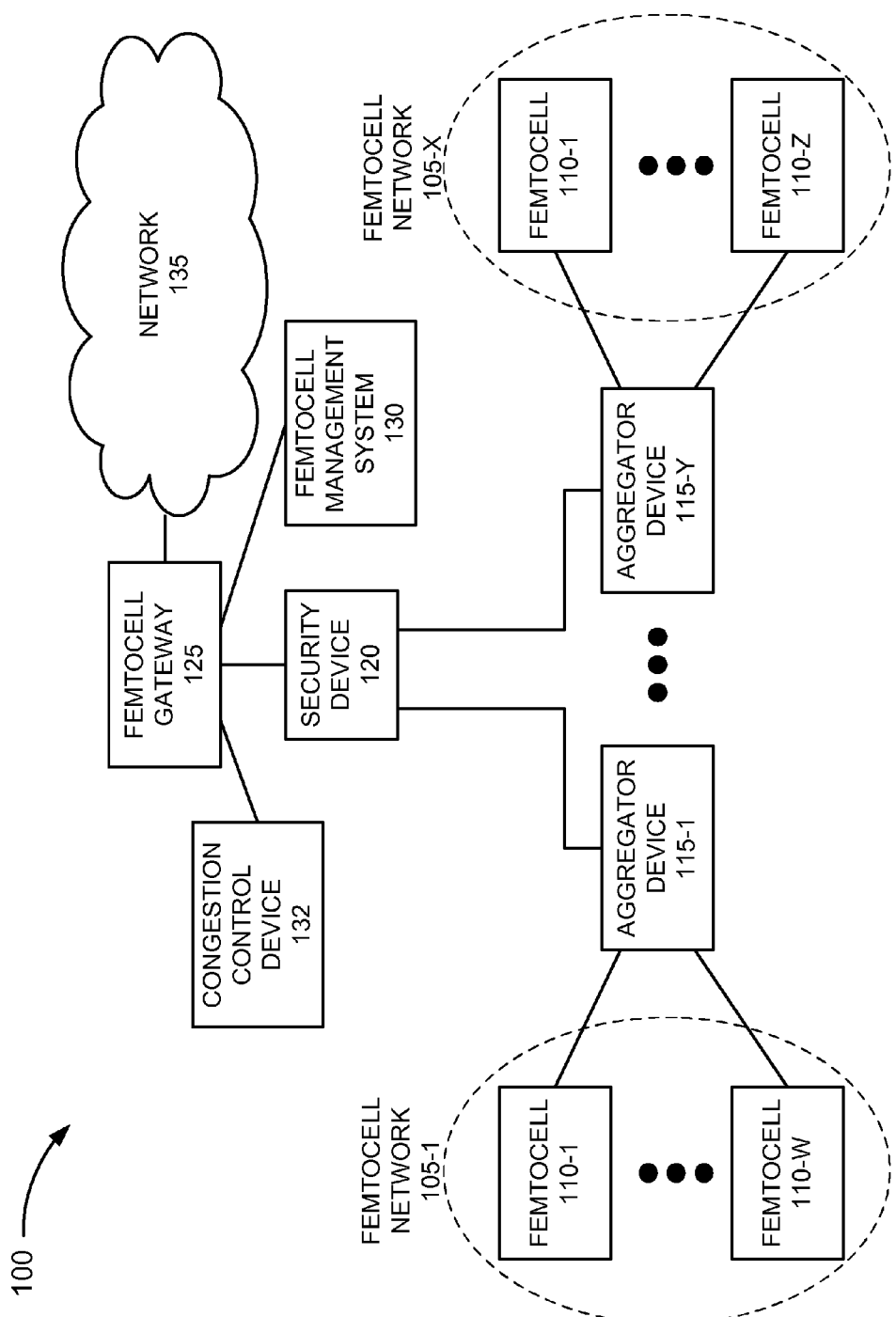
FIG. 1A is a diagram illustrating an exemplary environment in which an exemplary embodiment of femto congestion control may be implemented.

The following detailed description refers to the accompanying drawings. The same reference numbers in different drawings may identify the same or similar elements. Also, the following detailed description does not limit the invention.

As users adopt femtocells into their networks, congestion issues may result from the occurrence of certain events. For example, an event may include when femtocells perform self-updates (e.g., as new features are released) that cause hard reboots to occur. Subsequently, the femtocells attempt to register with a network around the same time. According to another example, an event may include when femtocells are power-cycled due to traffic demands or due to a power outage. Subsequently, the femtocells attempt to register with the network around the same time. As a result of these types of events, the network may be called to handle a large number of simultaneous communications to and/or from the femtocells. Since the number and capabilities of network devices that are provisioned to support the femtocells for a given geographical area are limited, absent some form of congestion control, the network devices may become overtaxed when these types of events, or other events which may disrupt service, occur.

According to an exemplary embodiment, a femto network device includes a congestion control service. According to an exemplary embodiment, the femto network device is implemented by a femto management system. According to other embodiments, the femto network device is implemented by a femto gateway device or another type of dedicated service node at a centralized location. According to yet other embodiments, the femto network device is implemented by multiple devices. For example, the congestion control service may be implemented by the femto gateway device and the femto management system, or some other combination of network devices.

According to an exemplary embodiment, the congestion control service manages various events that may cause congestion. For example, as previously described, events including registration, software update, and power-up self-recovery of a femtocell may be managed by the congestion control service. According to an exemplary embodiment, the congestion control service includes a single stage approach. For example, as described further below, the congestion control service may use one method to avoid congestion. According to another exemplary embodiment, the congestion control service includes a multi-stage approach. For example, as described further below, the congestion control service may use a first method to avoid congestion, and subsequently use another method. This may occur when one or multiple femtocells are unable to attain a service state after the first method is used.

According to an exemplary embodiment, the congestion control service uses a parameter to govern the ordering of femtocells to regain the service state. For example, according to an exemplary embodiment, the congestion control service uses traffic volume as a parameter to govern the ordering mechanism for congestion control. For example, the traffic volume stemming from femtocells of a given geographic region may be compared to one or multiple threshold values. Depending on the result of the comparison, the femtocells are coordinated for authentication and/or registration with the network based on a particular time value. As described further below, femtocells having a higher traffic volume than other femtocells may be given higher priorities, in terms of order, to authenticate and/or register with the network.

According to another exemplary embodiment, the congestion control service uses femto class as a parameter to govern the ordering mechanism for congestion control. For example, femtocells may be classified as an enterprise class and a residential class. As described further below, enterprise femtocells may be given a higher priority than residential femtocells, in terms of order, to authenticate and/or register with the network.

According to yet another exemplary embodiment, the congestion control service uses received signal strength as a parameter to govern the ordering mechanism for congestion control. For example, femtocells are generally equipped with sniffer receivers that are capable of measuring macrocell broadcast signal levels. Given that macrocell signal penetration varies within a building or other structure, this parameter may be used as the ordering mechanism. For example, the macro received signal strengths at femtocells may be compared to one or multiple threshold values. Depending on the result of the comparison, the femtocells are coordinated for authentication and/or registration with the network based on a particular time value. As further described below, femtocells having poor macro signal strength relative to other femtocells may be given higher priorities, in terms of order, to authenticate and/or register with the network.

According to still another exemplary embodiment, the congestion control service uses randomization to govern the ordering mechanism for congestion control. For example, the congestion control service calculates a random number based on the number of failed registration attempts and a time value.

As previously described, the congestion control service may use any of the above-mentioned methods, singly or in a combination (e.g., sequentially), as well as other methods described herein.

According to an exemplary embodiment, the congestion control service provides femtocells with instructions according to such a method so that the femtocells may attain service states in a coordinated manner while minimizing the likelihood of congestion.

FIG. 1A is a diagram illustrating an exemplary environment 100 in which an exemplary embodiment of femto congestion control may be implemented. As illustrated in FIG. 1A, exemplary environment 100 includes femtocell networks 105-1 through 105-X (also referred to as femtocell networks 105 and generally as femtocell network 105). As illustrated, femtocell network 105 includes a number of femtocells, such as femtocells 110-1 through 110-W (also referred to as femtocells 110 and generally as femtocell 110) for femtocell network 105-1, and femtocells 110-1 through 110-Z for femtocell network 105-X. Environment 100 also includes aggregator device 115-1 through 115-Y (also referred to as aggregators 115 and generally as aggregator 115), a security device 120, a femtocell gateway 125, a femtocell management system 130, a congestion control device 132, and a network 135.

Environment 100 may be implemented to include wired, optical, and/or wireless connections among the devices and the network illustrated. A connection may be direct or indirect and may involve an intermediary device and/or an intermediary network not illustrated in FIG. 1A. Additionally, the number, type (e.g., wired, wireless, etc.), and the arrangement of connections between the devices and the network are exemplary.

A device may be implemented according to a centralized computing architecture, a distributed computing architecture, or a cloud computing architecture (e.g., an elastic cloud, a private cloud, a public cloud, etc.). Additionally, a device may be implemented according to one or multiple network architectures (e.g., a client device, a server device, a peer device, a proxy device, and/or a cloud device).

The number of devices, the number of networks, and the configuration in environment 100 are exemplary. According to other embodiments, environment 100 may include additional devices, fewer devices, and/or differently arranged devices, than those illustrated in FIG. 1A. For example, femtocell network 105 may include a base station (e.g., an evolved Node B (eNB), etc.). Additionally, or alternatively, a single device in FIG. 1A may be implemented as multiple devices and/or multiple devices may be implemented as a single device. By way of further example, security device 120 and femtocell gateway 125 may be implemented as a single device, or security device 120 may be implemented as multiple devices. Additionally, or alternatively, environment 100 may include an additional network and/or a differently arranged network, than that illustrated in FIG. 1A. For example, environment 100 may include an intermediary network.

Figure 1B:
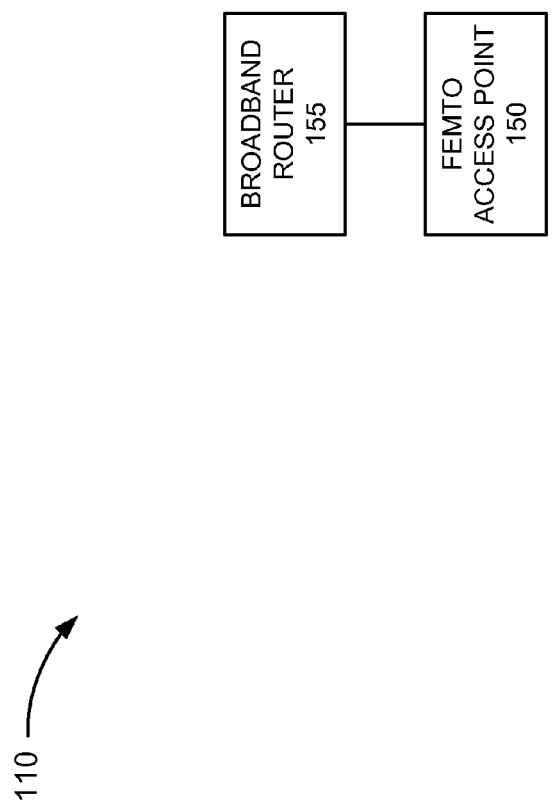
FIG. 1B is a diagram illustrating an exemplary femtocell.

Femtocell 110 includes a device that provides wireless coverage within a building or residence. Typically, the device connects to a mobile operator network via a broadband connection. Referring to FIG. 1B, an exemplary femtocell 110 includes a femto access point (FAP) 150. FAP 150 is connected to a broadband router 155 (e.g., Digital Subscriber Line (DSL), cable, fiber optic, etc.). In some implementations, FAP 150 may include the functionality of broadband router 155. FAP 150 supports a wireless technology, such as Long Term Evolution (LTE), Wideband Code Division Multiple Access (W-CDMA), CDMA2000, Worldwide Interoperability for Microwave Access (WiMax), etc. For example, an LTE femtocell is termed a Home enhanced Node B (HeNB). FAP 150 may vary in capabilities based on coverage, data rates, transmit power, etc. For example, FAP 150 may be a residential grade, a small enterprise grade, a medium enterprise grade, or a large enterprise grade femto device.

Although not illustrated, various types of user devices may connect to FAP 150. Aggregator device 115 includes a network device that provides an aggregation service for physically collocated femtocells 110.

Referring to FIG. 1A, security device 120 includes a network device that provides a security service. For example, security device 120 authenticates and authorizes femtocells 110. Security device 120 may also provide an encryption service to support signaling and user traffic, a firewall service, etc.

Femtocell gateway 125 includes a network device that provides gateway functions to a network (e.g., network 135). For example, femtocell gateway 125 may provide a network address translation (NAT) service, an accounting and billing service, quality-of-service (QoS) support, packet data service, etc. According to an exemplary embodiment, femtocell gateway 125 provides the congestion control service or a portion thereof, as described herein.

Femtocell management system 130 includes a network device that provides for the provisioning, configuring, updating, monitoring, and troubleshooting of femtocells 110. For example, femtocell management system 130 may manage software upgrades, performance data collection, remote diagnostics, fault management, remote configuration, radio frequency (RF) planning, etc. Femtocell management system 130 may also provide tools for a service provider to create workflows and models of services. According to an exemplary embodiment, femtocell management system 130 provides the congestion control service or a portion thereof, as described herein.

Congestion control device 132 includes a network device that provides the congestion control service, as described herein. Congestion control device 132 is optional. For example, as described above, the congestion control service may be implemented by femtocell gateway 125 or femtocell management system 130.

Figure 1C:
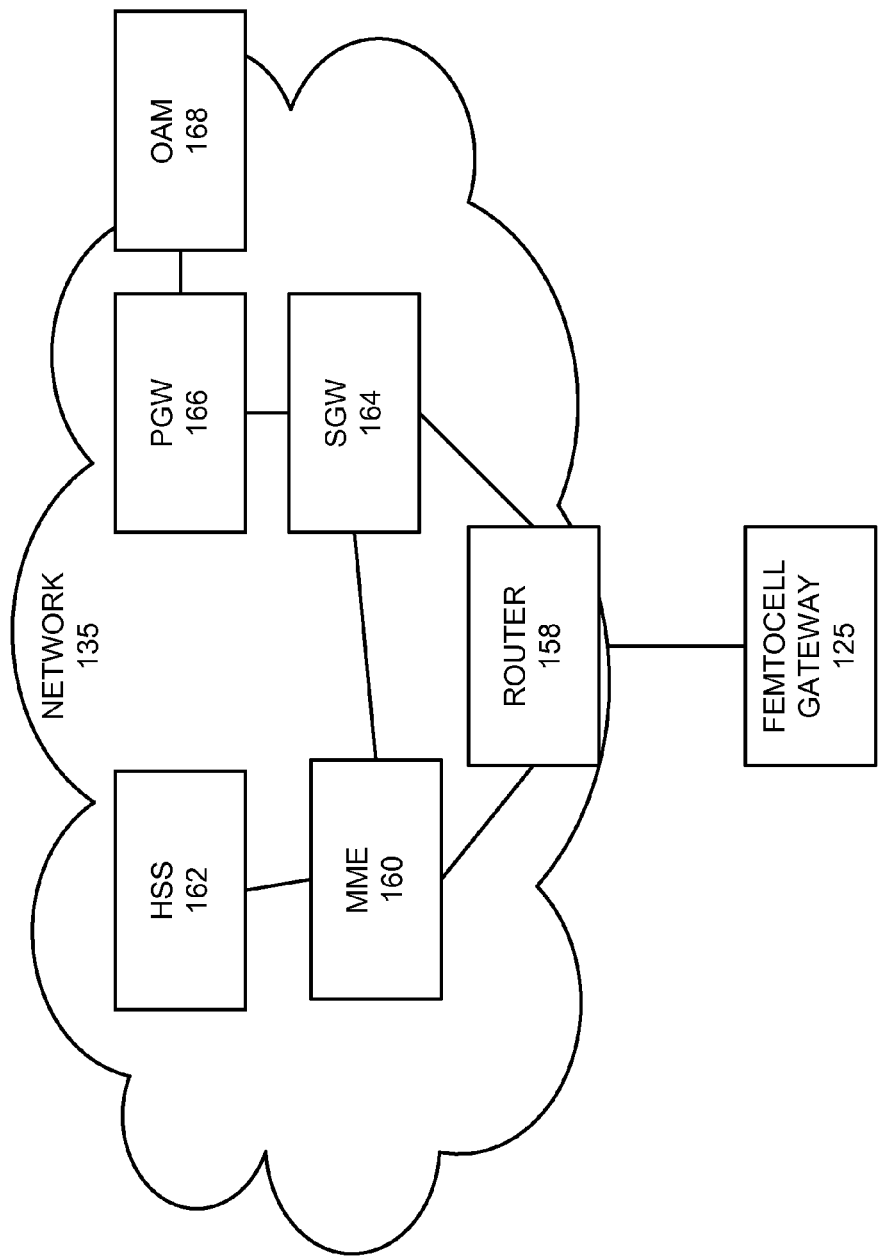
FIG. 1C is a diagram illustrating exemplary network elements included in a network depicted in FIG. 1A.
Figure 1D:
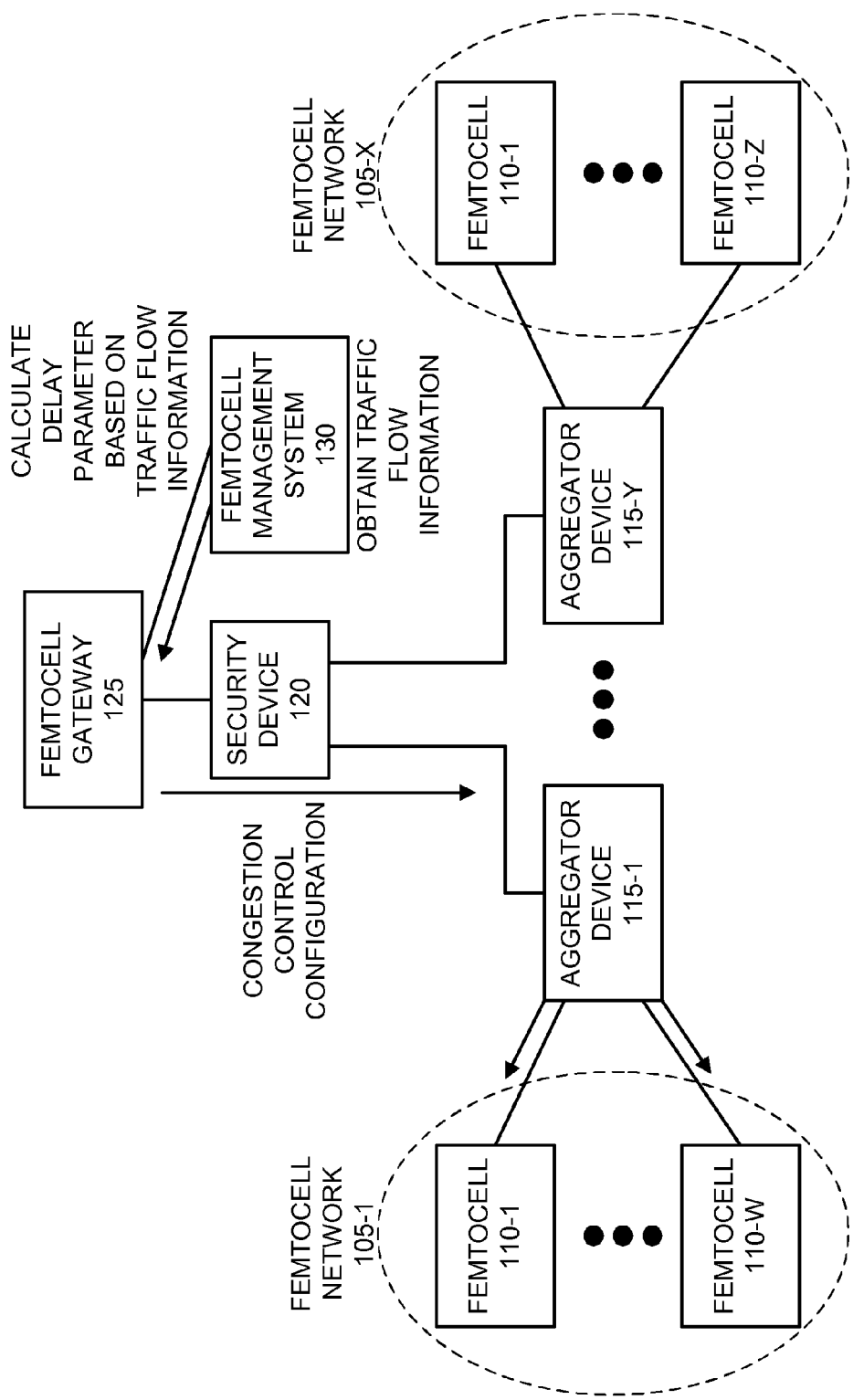
FIGS. 1D-1G are diagrams illustrating exemplary congestion control processes performed in an exemplary environment.
Figure 1E:
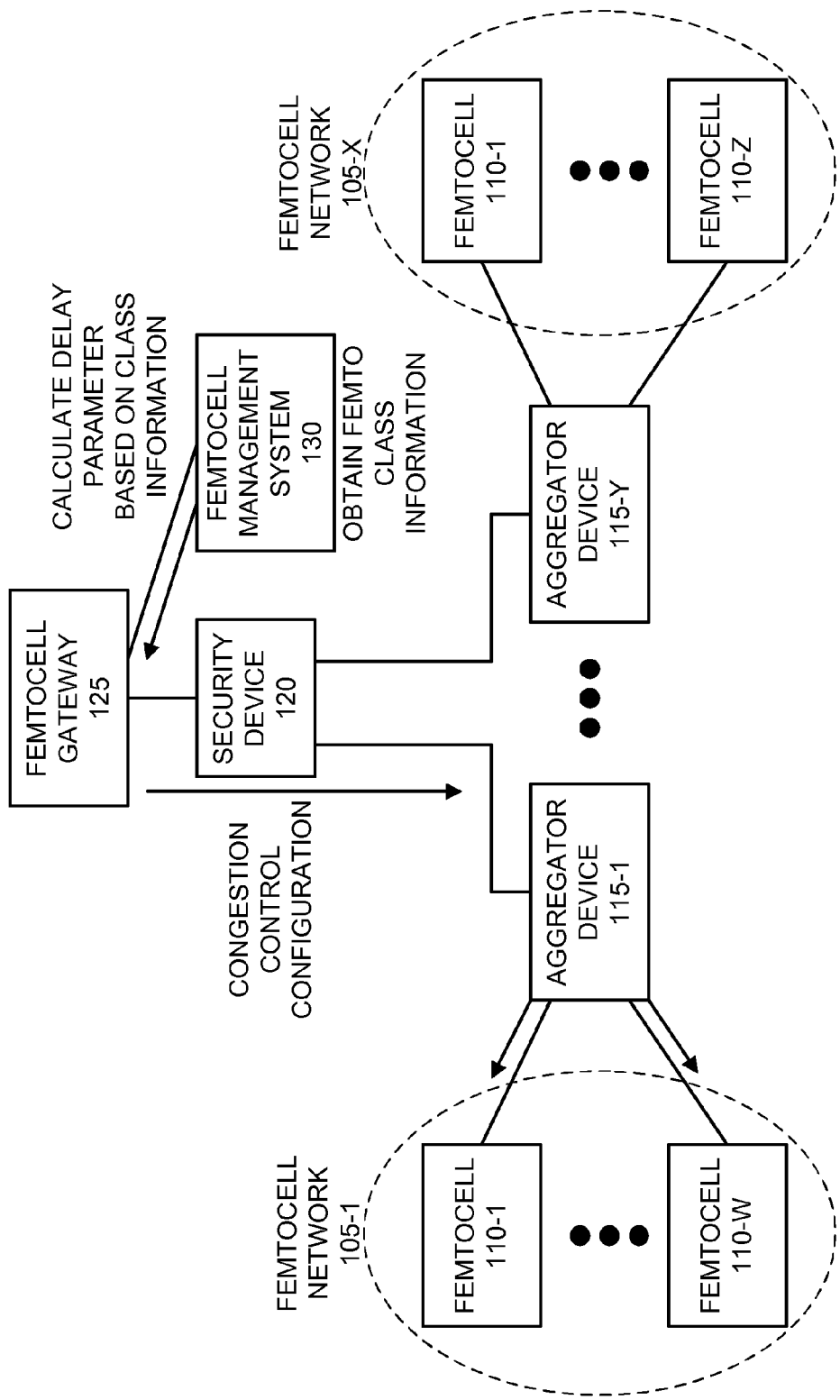

Network 135 includes one or multiple networks of one or multiple types. For example, network 105 may include the Internet, a wide area network, a private network, a public network, a packet-switched network, a wired network (e.g., an optical network, a cable network, etc.), a wireless network (e.g., a mobile network, a cellular network, etc.), etc. For example, referring to FIG. 1C, network 135 may include network elements of the LTE standard, such as a mobility management entity (MME 160), a serving gateway (SGW) 164, a packet data network gateway (PGW) 166, as well as other network elements, such as a router 158, a home subscriber server (HSS) 162, and an Operation, Administration, and Maintenance (OAM) device 168. The network devices and connections depicted in FIG. 1C are merely exemplary.

FIGS. 1D-1G are diagrams illustrating exemplary congestion control processes. According to these examples, the congestion control processes are described in relation to femtocell management system 130. However, as previously described, according to other implementations, a method of congestion control may be implemented by femtocell gateway 125. Depending on the event (e.g., power outage, software update, etc.), the congestion control service may need to coordinate congestion control among multiple femtocell networks 105 or a single femtocell network 105. For example, a power outage may impact femtocell network 105-1 and femtocell network 105-X, whereas a software update may impact a single femtocell network 105 or a portion thereof.

As previously described, according to an exemplary embodiment, the congestion control service uses a parameter to govern the ordering among femtocells to regain the service state. For example, according to an exemplary embodiment, the congestion control service uses traffic volume as a parameter to govern the ordering mechanism for congestion control. For example, referring to FIG. 1D, femtocell management system 130 obtains traffic flow information from femtocell gateway 125 pertaining to femtocell networks 105. The traffic flow information may indicate a volume of traffic flow from and/or to each femtocell 110 based on historical traffic usage or predicated on traffic usage. Based on the traffic flow information, femtocell management system 130 calculates a delay parameter for each femtocell 110. For example, femtocell management system 130 uses a threshold traffic volume value to assign a delay parameter to a particular femtocell 110, as provided by the following exemplary expressions:

$$\text{Traffic Volume of Femtocell} > L1; \text{ Delay parameter } t = t1; \quad (1)$$

$$L1 > \text{Traffic Volume of Femtocell} > L2; \text{ Delay parameter } t = t2, \text{ in which } t2 > t1; \quad (2)$$

$$Ln > \text{Traffic Volume of Femtocell} > Ln-1; \text{ Delay parameter } t = tn \text{ in which } tn > tn \times 1 \quad (3),$$

in which L1, L2, . . . Ln are threshold traffic volume values, and the delay parameter t represents a delay period for femtocell 110 to wait after an event occurs. For example, after femtocell 110 is powered back up from a hard re-boot, femtocell 110 would wait the delay period indicated by delay parameter t before requesting authentication with, for example, security device 120, and registration with, for example, femtocell gateway 125 or another network device in network 135. As illustrated, femtocell management system 130 provides congestion control configurations to femtocells 110 in accordance with the calculated delay parameter values.

According to another exemplary embodiment, the congestion control service uses femto class as a parameter to govern the ordering mechanism for congestion control. For example, referring to FIG. 1E, femtocell management system 130 obtains femto class information pertaining to femtocells 110. For example, as previously described, FAP 150 may be a residential grade, a small enterprise grade, a medium enterprise grade, or a large enterprise grade femto device. Each grade may be assigned a unique value. Femtocell management system 130 may store femto class information in database or access this information from a storage device (not illustrated). Based on the class information, femtocall management system 130 calculates delay periods for femtocells 110, as provided by the following exemplary expression:

$$T(C) + (k \times t(C)) = \text{delay parameter } t \quad (4),$$

in which T is a time period depending on the femto class C; k is a random number between $2^h - 1$ and 0, h is the number of failed attempts to authenticate and/or register; and t is a default time period (e.g., 1 second, 2 seconds, 20 seconds, etc.) depending on the femto class C. As described further below, expression (9) is similar to expression (4), except in expression (4) the value T(C) adds extra time to the delay parameter t. According to an exemplary implementation, the value for T(C) may be unique for each femto class. Additionally, according to an exemplary implementation, the value for t(C) may be unique for each femto class.

According to an exemplary implementation, the time period T is the shortest for large enterprise grade femto devices and the longest for residential grade femto devices as indicated by the following exemplary expression:

$$T(\text{large enterprise}) < T(\text{medium enterprise}) < T(\text{small enterprise}) < T(\text{residential}). \quad (5)$$

As illustrated, femtocell management system 130 provides congestion control configurations to femtocells 110 in accordance with the calculated delay parameter value of expression (4).

Figure 1F:
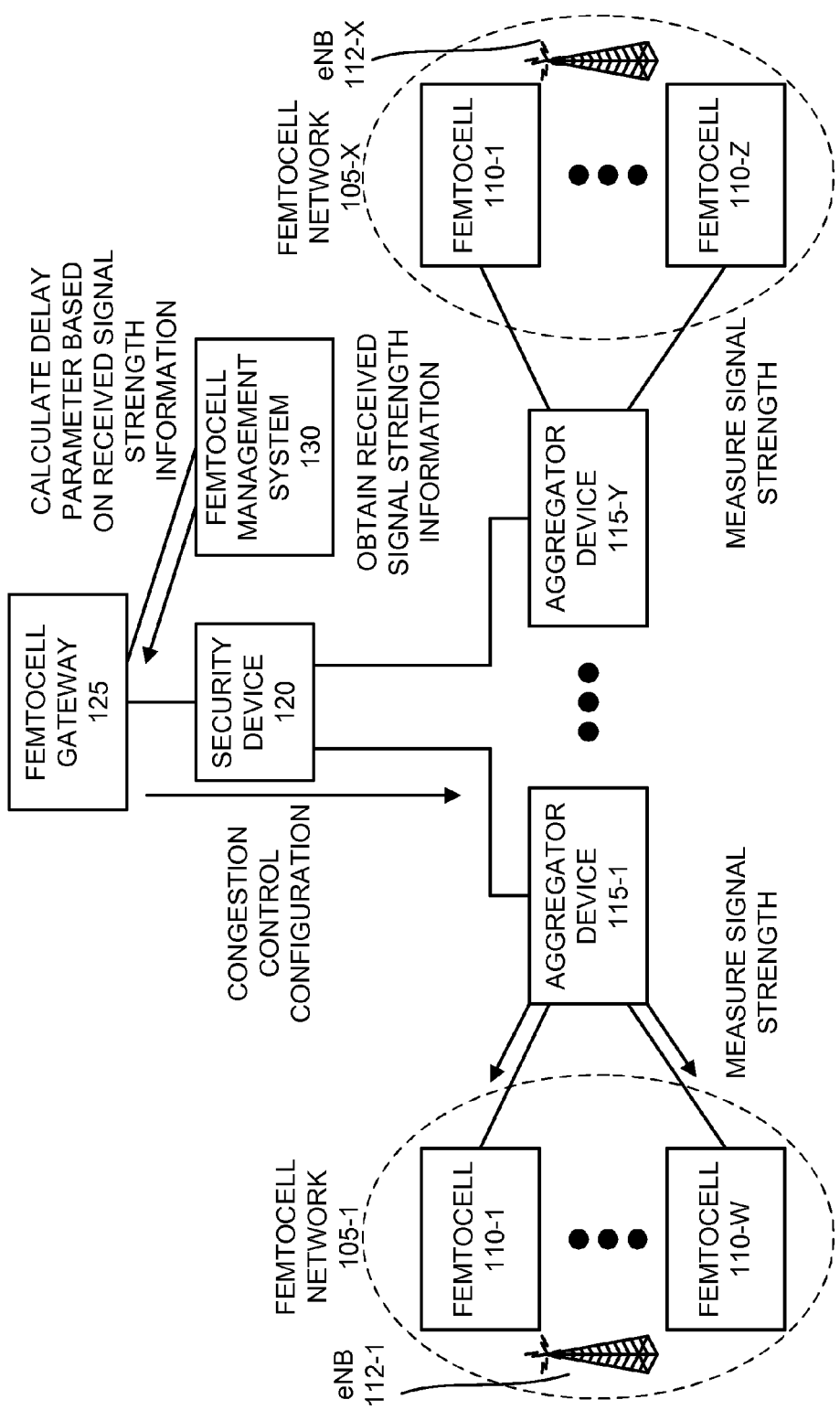
Figure 1G:
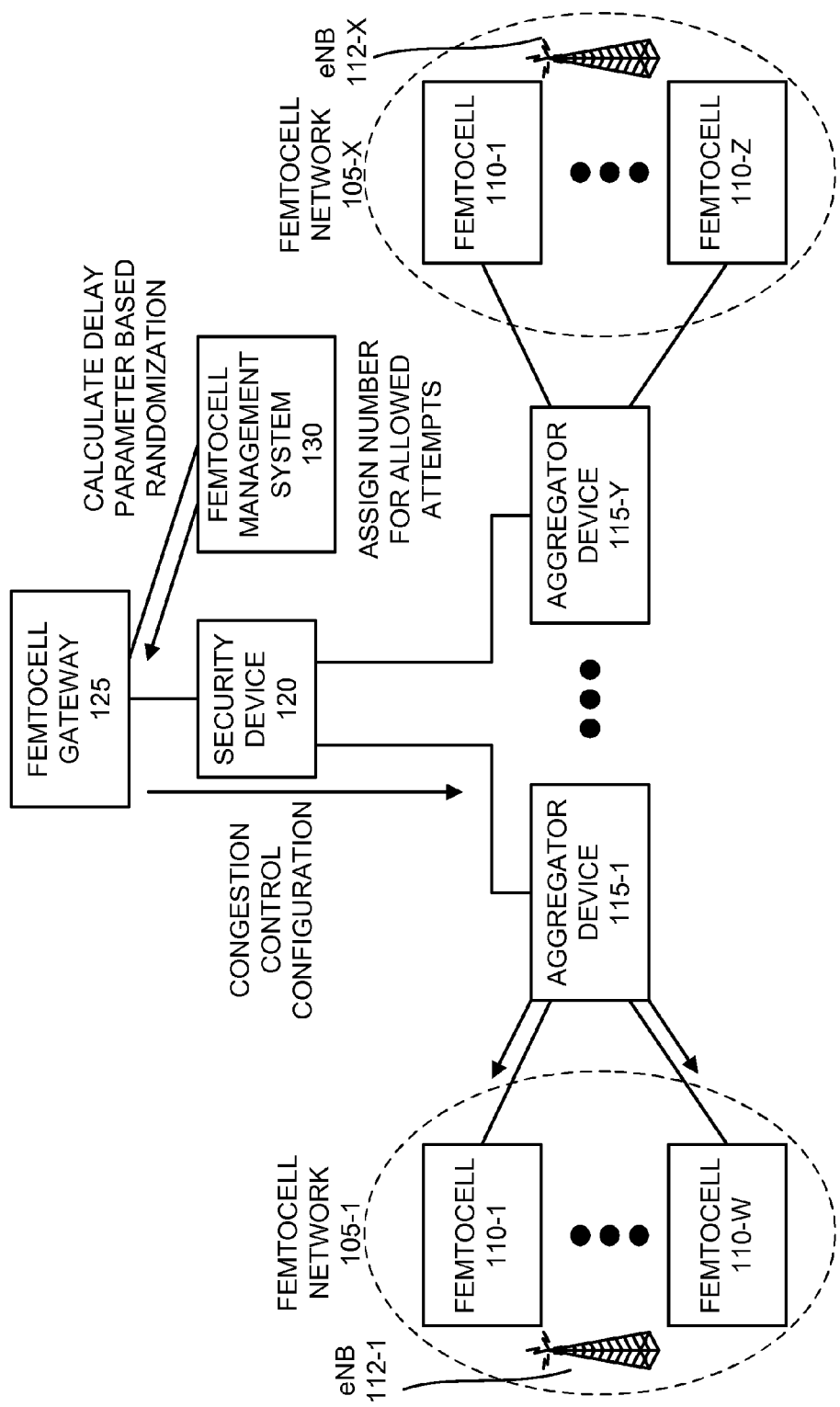

According to yet another exemplary embodiment, the congestion control service uses received signal strength as a parameter to govern the ordering mechanism for congestion control. For example, as previously described, the macro received signal strengths of femtocells may be compared to one or multiple threshold values. Referring to FIG. 1F, as illustrated, femtocell networks 105 each includes an eNB 112 (enB 112-1 through 112-X). Assume, each eNB 112 broadcasts a signal within the geographic area of femtocell network 105. FAP 150 of femtocell 110 may measure the strength of the broadcast signal and provide this information to femtocell management system 130. For example, FAP 150 may provide a received signal strength indicator (RSSI) or other measurement of power. Based on the received signal strength information, femtocell management system 130 calculates a delay parameter for each femtocell 110. For example, femtocell management system 130 uses a threshold power value to assign a delay parameter to a particular femtocell 110, as provided by the following exemplary expressions:

$$RSS \text{ of Femtocell} > P1; \text{ Delay parameter } t = t1; \quad (6)$$

$$P1 > RSS \text{ of Femtocell} > P2; \text{ Delay parameter } t = t2, \text{ in which } t2 > t1; \quad (7)$$

$$Pn > RSS \text{ of Femtocell} > Pn-1; \text{ Delay parameter } t = tn \text{ in which } tn > tn \times 1 \quad (8),$$

in which P1, P2, . . . Pn are threshold power values, RSS of Femtocell indicates the received signal strength (RSS) by the femtocell, and the delay parameter t represents a delay period for femtocell 110 to wait after an event occurs. As further illustrated in FIG. 1F, femtocell management system 130 provides congestion control configurations to femtocells 110 in accordance with the calculated delay parameter values. According to an exemplary implementation, based on expressions (6), 7, etc., femtocells 110 reporting lower RSS values compared to other femtocells 110 may be assigned shorter delay time periods.

According to still another exemplary embodiment, the congestion control service uses randomization to govern the ordering mechanism for congestion control. For example, referring to FIG. 1G, femtocell management system 130 provides congestion control configuration information to femtocells 110 in which the congestion control configuration information includes the following exemplary expression to calculate the delay parameter value:

$$k \times t = \text{delay parameter } t \quad (9),$$

in which k is a random number between $2^h - 1$ and 0, h is the number of failed attempts to authenticate and/or register; and t is a default time period (e.g., 1 second, 2 seconds, 10 seconds, 14 seconds, etc.). Since h is the number of failed attempts to authenticate and/or register, delay parameter t is iteratively calculated. According to an exemplary embodiment, the congestion control configuration information includes an allowed number of authentication and/or registration attempts. By way of example, femtocell management system 130 may limit the number of attempts for femtocell 110 to authenticate and/or register to a specific number (e.g., 5, 10, 12, etc.). For example, the allowed number of attempts may serve as a trigger, once exhausted, to stop using the randomization approach and try another congestion control method, as described herein. According to an exemplary embodiment, FAP 150 uses expression (9) to calculate the randomization approach. For example, FAP 150 may attempt to authenticate and/or register without any delay, and then if a failure occurs, use expression (9) to calculate the back-off period, in which after the first failed attempt h=1, after the second failed attempt h=2, etc. FAP 150 selects a random number between $2^h-1$ and 0. In this way, the domain for selecting a random number increases as the number of failed attempts increases.

While the exemplary processes provide examples of the congestion control service, other data may be considered. For example, the congestion control configuration may designate a particular event for which the congestion control method is invoked. FAP 150 may select a particular congestion control method based on identifying the event that occurred. For example, FAP 150 may identify when the event is a software update. Alternatively, FAP 150 may more generally determine if the event was scheduled or unscheduled (e.g., unexpected). Based on these types of determinations, FAP may select a particular congestion control method or a series of methods. Additionally, as previously described, each of the processes described in relation to FIGS. 1D-1G, as well as elsewhere in this description, may be performed singly as a measure to minimize congestion. Alternatively, a sequential series of processes may be performed, such as the randomization process followed by the traffic flow-based process, etc.

FIG. 2 is a diagram illustrating exemplary components of a device 200 that may correspond to one or more of the devices illustrated in the previous figures. For example, device 200 may correspond to components included in femtocell 110, security device 120, femtocell gateway 125, femtocell management system 130, FAP 150, etc. As illustrated, device 200 includes a processor 205, a memory/storage 210 that stores software 215, a communication interface 220, an input 225, and an output 230. According to other implementations, device 200 may include fewer components, additional components, different components, and/or a different arrangement of components than those illustrated in FIG. 2 and described herein.

Processor 205 includes one or multiple processors, microprocessors, data processors, co-processors, multi-core processors, application specific integrated circuits (ASICs), controllers, programmable logic devices, chipsets, field programmable gate arrays (FPGAs), system on chips (SoCs), programmable logic devices (PLSs), microcontrollers, application specific instruction-set processors (ASIPs), central processing units (CPUs), or some other component that interprets and/or executes instructions and/or data. Processor 205 may be implemented as hardware (e.g., a microprocessor, etc.) or a combination of hardware and software (e.g., a SoC, an ASIC, etc.). Processor 205 may include one or multiple memories (e.g., memory/storage 210), etc.

Processor 205 may control the overall operation, or a portion of operation(s) performed by device 200. Processor 205 may perform one or multiple operations based on an operating system and/or various applications or programs (e.g., software 215). Processor 205 may access instructions from memory/storage 210, from other components of device 200, and/or from a source external to device 200 (e.g., another device, a network, etc.).

Memory/storage 210 includes one or multiple memories and/or one or multiple other types of storage mediums. For example, memory/storage 210 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory, and/or some other type of memory. Memory/storage 210 may include a hard disk (e.g., a magnetic disk, an optical disk, a magneto-optic disk, a solid state disk, etc.) and a corresponding drive. Memory/storage 210 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 210 may include drives for reading from and writing to the storage medium.

Memory/storage 210 may be external to and/or removable from device 200, such as, for example, a Universal Serial Bus (USB) memory stick, a dongle, a hard disk, mass storage, off-line storage, or some other type of storage medium (e.g., a compact disk (CD), a digital versatile disk (DVD), a Blu-Ray® disk (BD), etc.). Memory/storage 210 may store data, software, and/or instructions related to the operation of device 200

Software 215 includes an application or a program that provides a function and/or a process. Software 215 may include firmware. For example, with reference to femtocell management system 130, software 215 may include an application that, when executed by processor 205, provides the congestion control service, as described herein.

Communication interface 220 permits device 200 to communicate with other devices, networks, systems and/or the like. Communication interface 220 includes one or multiple wireless interface(s) and/or wired interface(s). For example, communication interface 220 may include one or multiple transmitter(s) and receiver(s), or transceiver(s).

Input 225 provides an input into device 200. For example, input 225 may include a keyboard, a mouse, an input port, a button, a switch, a microphone, a knob, and/or some other type of input. Output 230 provides an output from device 200. For example, output 230 may include a display, a speaker, a light (e.g., light emitting diode(s), etc.), an output port, and/or some other type of output.

Device 200 may perform a function or a process in response to processor 205 executing software instructions stored by memory/storage 210. For example, the software instructions may be read into memory/storage 210 from another memory/storage 210 or read from another device via communication interface 220 into memory/storage 210. The software instructions stored in memory/storage 210 may cause processor 205 to perform processes described herein. Alternatively, according to another implementation, device 200 may perform a process or a function based on the execution of hardware (e.g., processor 205, etc.).

Figure 3:
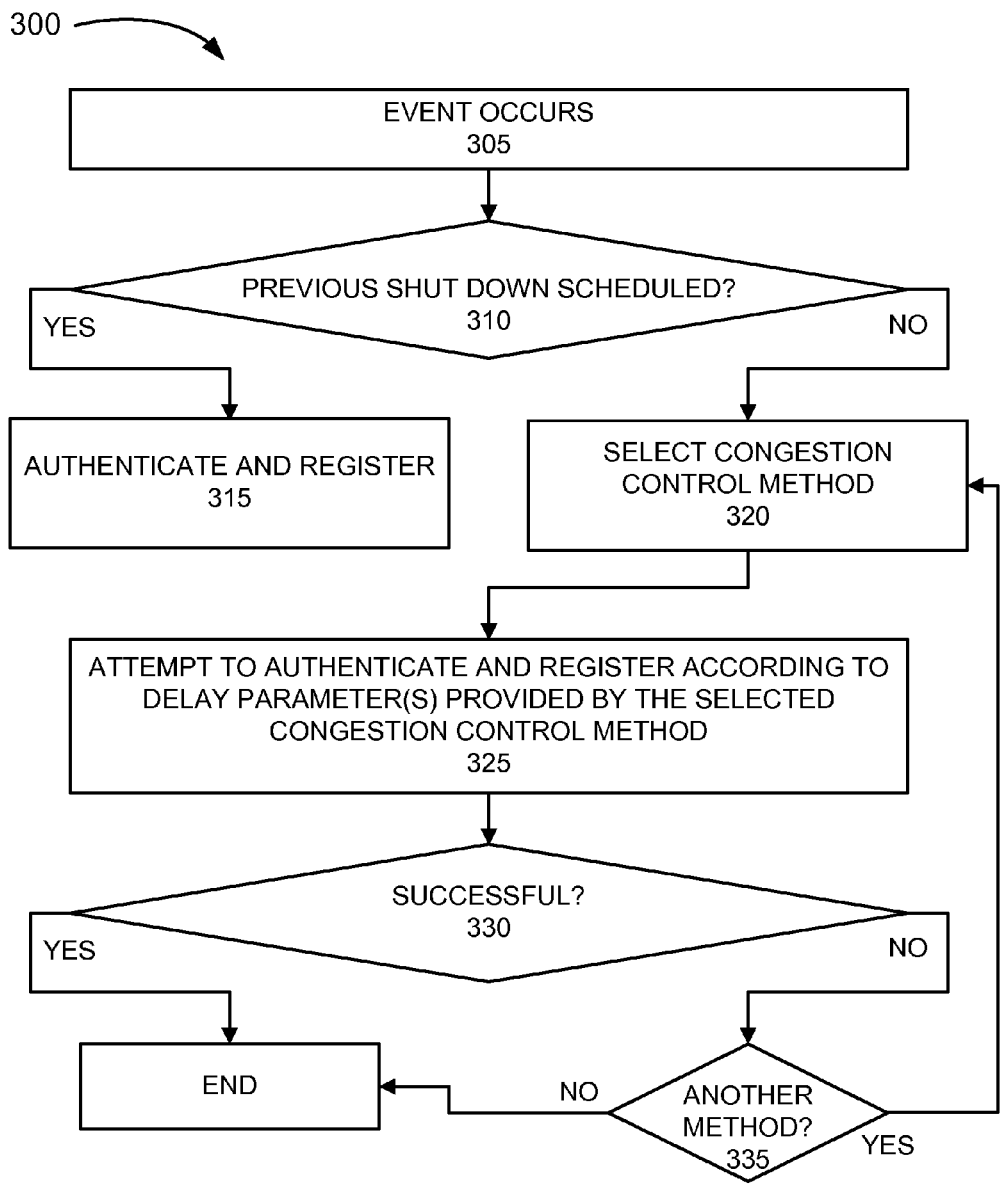
FIGS. 3-7 are flow diagrams illustrating exemplary congestion control processes.

FIG. 3 is a flow diagram illustrating an exemplary congestion control process 300. Process 300 is directed to an embodiment in which FAP 150 performs a congestion control method subsequent to an event. For example, FAP 150 performs process 300 based on processor 205 executing software 215.

Referring to FIG. 3, process 300 begins, in block 305, in which an event occurs. For example, the event may be a software update, a power outage, or a power-cycle event due to traffic demands. The event causes FAP 150 to shutdown and reboot.

In block 310, it is determined whether the previous shutdown was scheduled. For example, FAP 150 determines whether the previous shutdown was scheduled. By way of example, FAP 150 may be instructed and expected to shutdown at a particular time. For example, FAP 150 may have a scheduled reboot or a scheduled software update. This is in contrast to an event that is unexpected, such as a power outage, or other unscheduled event (e.g., a user turns off FAP 150 and subsequently turns on FAP 150).

If it is determined that the previous shutdown was scheduled (block 310—YES), then the FAP authenticates and registers (block 315). For example, FAP 150 authenticates and registers with security device 120, femtocell gateway 125, and/or network 135 without using a congestion control method. That is, since the event is scheduled, congestion control is already managed.

If it is determined that the previous shutdown was not scheduled (block 310—NO), then the FAP selects a congestion control method (block 320). For example, FAP 150 selects one of the congestion control methods previously described, such as the randomization method, or one of the parameter-based methods (e.g., volume of traffic flow, class of FAP 150, RSS).

In block 325, authentication and registration are attempted according to a delay parameter provided by the selected congestion control method. For example, FAP 150 uses a calculated delay parameter value to govern when to attempt authentication and registration. Depending on the selected congestion control method, FAP 150 may make multiple attempts.

If it is determined whether authentication and registration are successful (block 330). For example, FAP 150 determines whether the attempt to register and authenticate was successful. If it is determined that the attempt to authenticate and register was successful (block 330—YES), then process 300 ends. For example, FAP 130 provides a femto service. If it is determined that the attempt is unsuccessful (block 330—NO), then it is determined whether another congestion control method is to be selected (block 335). For example, FAP 150 may be configured to use a series of two or more congestion control methods, as previously described. If it is determined that another congestion control method is to be selected (block 335—YES), then process 300 continues to block 320. For example, FAP 150 selects the next congestion control method to perform to authenticate and/or register with security device 120, femtocell gateway 125, and/or network 135. If it is determined that there is not another congestion control method to select (block 335—NO), then process 300 ends.

FIGS. 4-7 are diagrams illustrating exemplary congestion control processes. According to an exemplary embodiment, each of the processes may be performed by femtocell management system 130, femtocell gateway 125, or a combination thereof. Alternatively, a dedicated congestion control device 132, which may be co-located with femtocell management system 130 and/or femtocell gateway 125 may perform a process. For sake of simplicity, each of the processes will be described as being performed by femtocell management system 130. The congestion control service may be implemented by processor 205 executing software 215.

Figure 4:
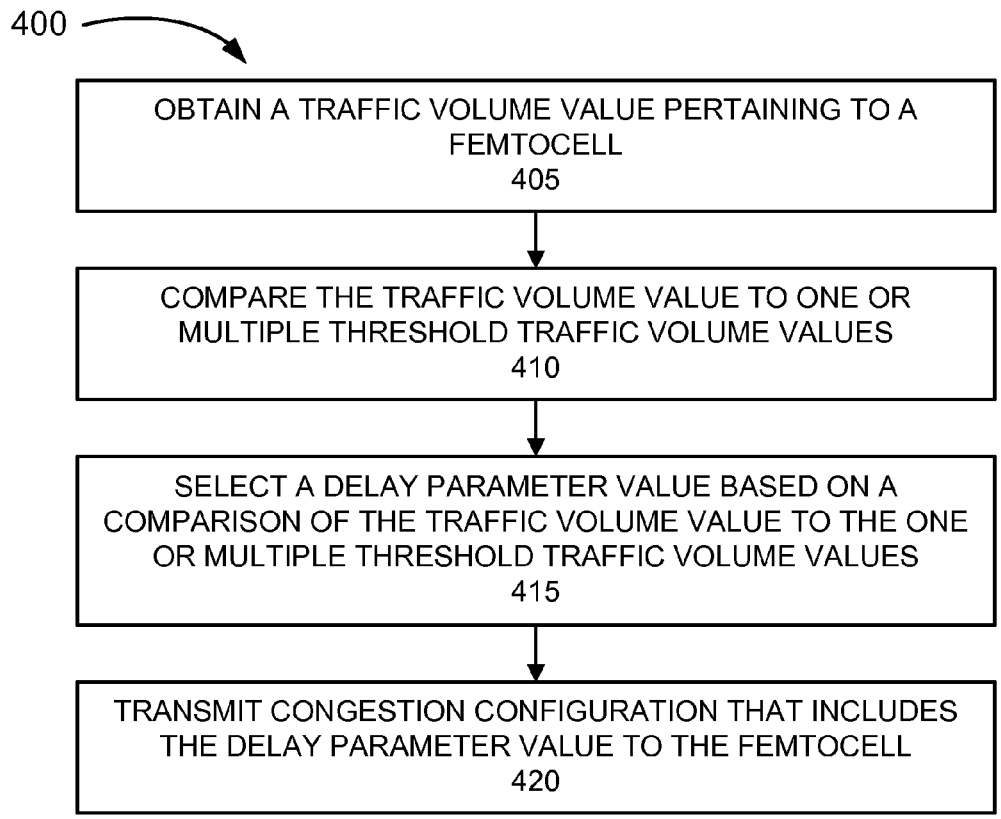

FIG. 4 is a flow diagram illustrating an exemplary congestion control process 400. Process 400 is directed to the embodiment, previously described above with respect to FIG. 1D, as well as elsewhere in this description, in which the congestion control service calculates a delay parameter value based on a volume of traffic stemming from femtocell 110.

Referring to FIG. 4, process 400 begins in block 405, in which a traffic volume value pertaining to femtocell is obtained. For example, femtocell management system 130 obtains a traffic volume value pertaining to femtocell 110. For example, femtocell management system 130 may be provided with traffic flow information from femtocell gateway 125. Alternatively, femtocell management system 130 may access a database that stores processed raw data pertaining to the traffic flow at femtocells 110.

In block 410, the traffic volume value is compared to one or multiple threshold traffic volume values. For example, femtocell management system 130 calculates a delay parameter value based on expressions (1), (2), and/or (3), as previously described.

In block 415, a delay parameter value is selected based on a comparison. For example, femtocell management system 130 selects a delay parameter value according to the appropriate expression.

In block 420, congestion control configuration is transmitted to the femtocell. For example, femtocell management system 130 transmits the delay parameter value to femtocell 110.

Figure 5:
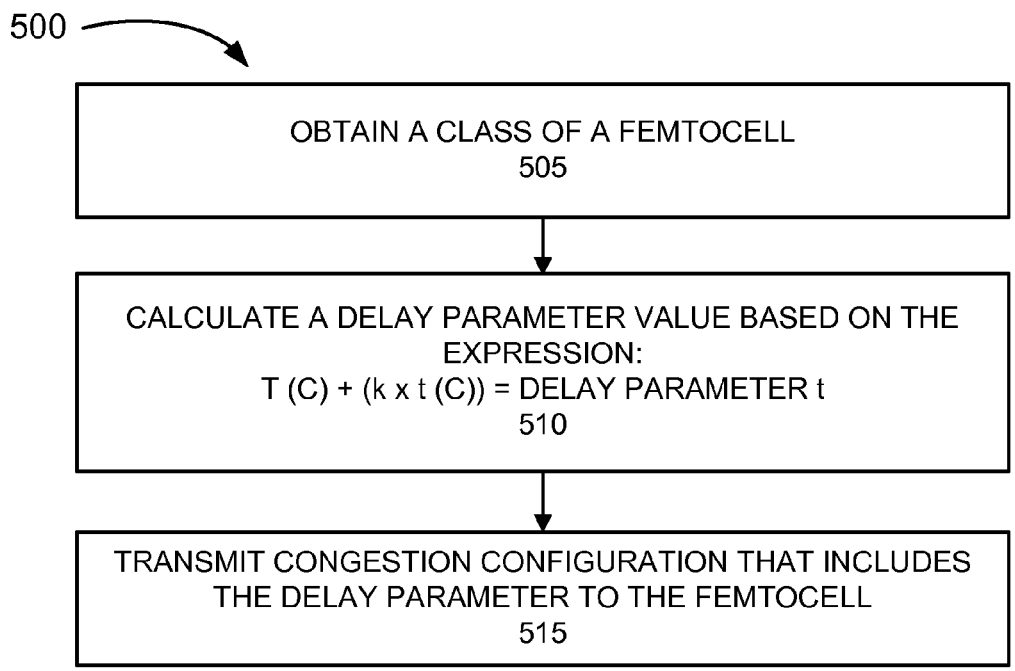

FIG. 5 is a flow diagram illustrating another exemplary congestion control process 500. Process 500 is directed to the embodiment, previously described above with respect to FIG. 1E, as well as elsewhere in this description, in which the congestion control service calculates a delay parameter value based on a class of femtocell 110.

Referring to FIG. 5, process 500 begins in block 505, in which a class of a femtocell is obtained. For example, femtocell management system 130 may access a database that stores class information pertaining to femtocells 110.

In block 510, a delay parameter is calculated based on the class information. For example, femtocell management system 130 calculates a delay parameter value according to expression (4), as previously described.

In block 515, congestion control configuration is transmitted to the femtocell. For example, femtocell management system 130 transmits the delay parameter value to femtocell 110.

Figure 6:
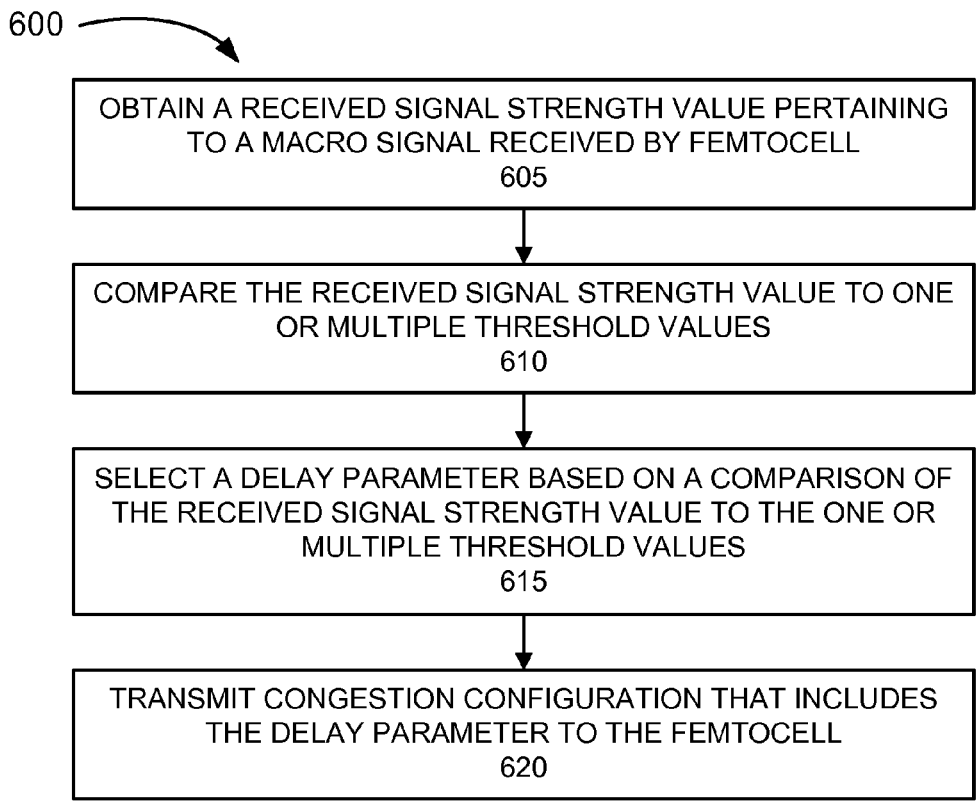

FIG. 6 is a flow diagram illustrating an exemplary congestion control process 600. Process 600 is directed to the embodiment, previously described above with respect to FIG. 1F, as well as elsewhere in this description, in which the congestion control service calculates a delay parameter value based on a received signal strength value of a macro signal from a femtocell perspective.

Referring to FIG. 6, process 600 begins in block 605, in which a received signal strength (RSS) value pertaining to femtocell is obtained. For example, femtocell management system 130 obtains an RSS value pertaining to femtocell 110. For example, femtocell 110 may provide the RSS value. Alternatively, femtocell management system 130 may access a database that stores RSS values for femtocells 110.

In block 610, the RSS value is compared to one or multiple threshold values. For example, femtocell management system 130 calculates a delay parameter value based on expressions (6), (7), and/or (8), as previously described.

In block 615, a delay parameter value is selected based on a comparison. For example, femtocell management system 130 selects a delay parameter value according to the appropriate expression.

In block 620, congestion control configuration is transmitted to the femtocell. For example, femtocell management system 130 transmits the delay parameter value to femtocell 110.

Figure 7:
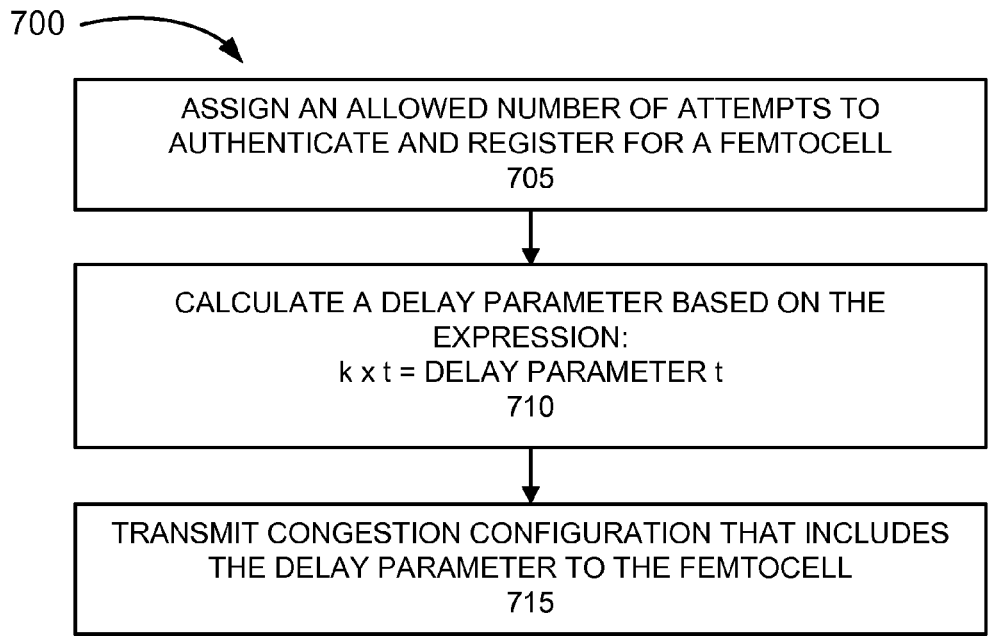

FIG. 7 is a flow diagram illustrating yet another exemplary congestion control process 700. Process 700 is directed to the embodiment, previously described above with respect to FIG. 1G, as well as elsewhere in this description, in which the congestion control service calculates a delay parameter value based on a randomization value.

Referring to FIG. 7, process 700 begins in block 705, in which an allowed number of attempts to authenticate and register for a femtocell is assigned. For example, femtocell management system 130 assigns a value for this parameter with respect to femtocell 110.

In block 710, a delay parameter is calculated based on the number of failed attempts. For example, femtocell 110 calculates a delay parameter value according to expression (9), as previously described. Femtocell management system 130 identifies In block 715, congestion control configuration is transmitted to the femtocell. For example, femtocell management system 130 transmits the delay parameter value to femtocell 110. According to other embodiments, process 700 may not assign an allowed number of attempts. That is, femtocell management system 130 may not limit the number of failed attempts by virtue of a value that limits the number of attempts to authenticate and/or register. According to yet another embodiment, if the allowed number of attempts is met, this value may serve as a trigger to switch to another congestion control method.

The foregoing description of implementations provides illustration, but is not intended to be exhaustive or to limit the implementations to the precise form disclosed. Accordingly, modifications to the implementations described herein may be possible. For example, although embodiments have been described in relation to femtocells, other types of wireless nodes (e.g., radio nodes) may be used. By way of further example, the wireless nodes may correspond to picocells, microcells (e.g., less than 2 kilometers coverage), metrocells, and macrocells (e.g., base stations (BSs)). A further description is provided below.

Figure 8:
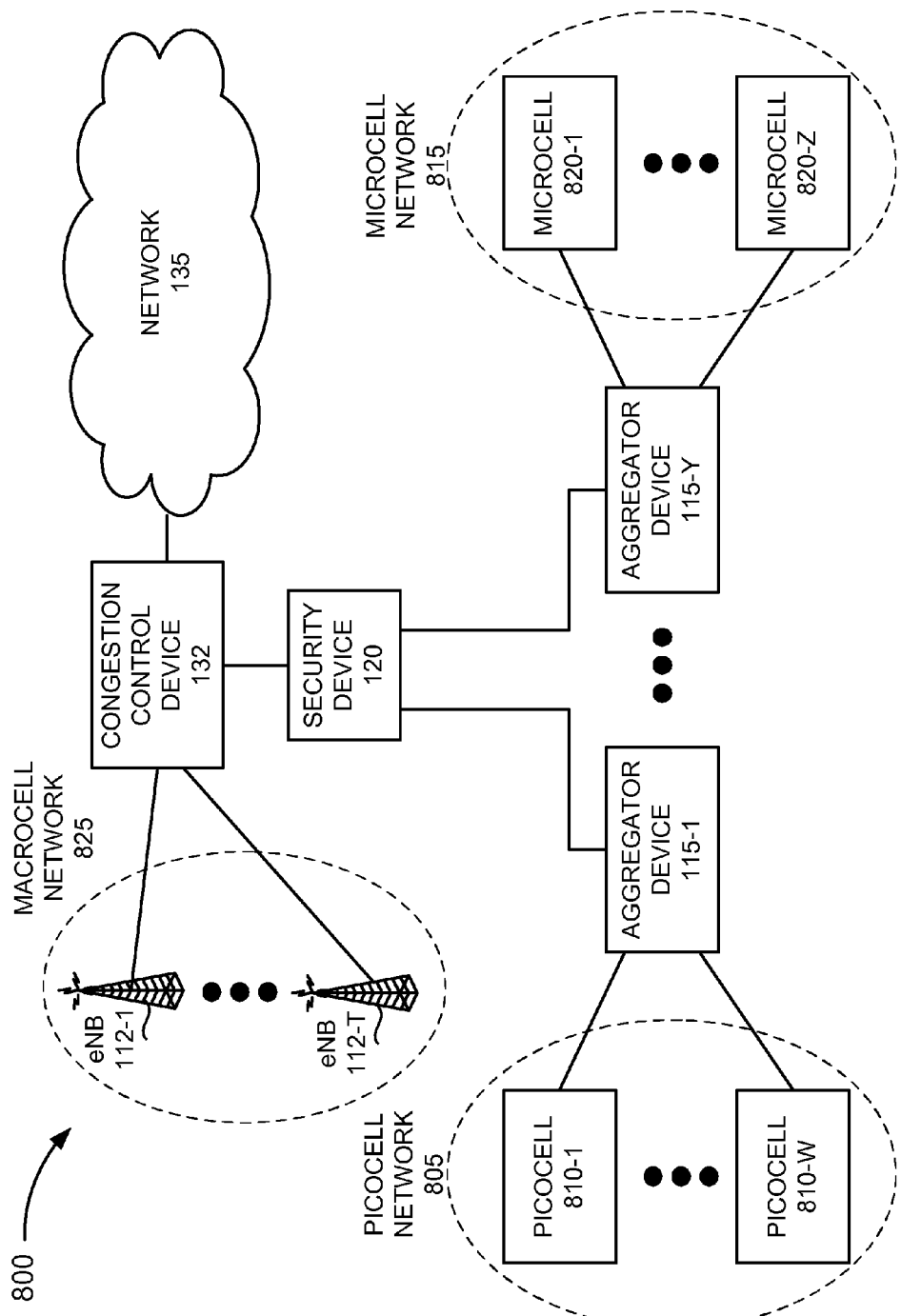
FIG. 8 is a diagram illustrating another exemplary environment in which an exemplary embodiment of congestion control may be implemented.

FIG. 8 is a diagram illustrating another exemplary environment in which an exemplary embodiment of congestion control may be implemented. As illustrated, an environment 800 includes a picocell network 805, which includes picocells 810-1 through 810-W (also referred to as picocells 810 and generally as picocell 810), a microcell network 815, which includes microcells 820-1 through 820-Z (also referred to as microcells 820 and generally as microcell 820), and a macrocell network 825, which includes eNBs 112. As further illustrated, environment 800 includes aggregator devices 115, security device 120, congestion control device 132, and network 135.

Environment 800 may be implemented to include wired, optical, and/or wireless connections among the devices and the network illustrated. A connection may be direct or indirect and may involve an intermediary device and/or an intermediary network not illustrated in FIG. 8. Additionally, the number, type (e.g., wired, wireless, etc.), and the arrangement of connections between the devices and the network are exemplary.

The number of devices, the number of networks, and the configuration in environment 800 are exemplary. According to other embodiments, environment 800 may include additional devices, fewer devices, and/or differently arranged devices, than those illustrated in FIG. 8. For example, picocell network 805, microcell network 815, and/or macrocell network 825 may include a mixture of picocells 810, microcells 820, and/or eNBs 112. Additionally, or alternatively, environment 800 may include an additional network and/or a differently arranged network, than that illustrated in FIG. 8. For example, environment 800 may include an intermediary network.

According to an exemplary congestion control device 132 provides the congestion control service for picocells 810, microcells 820, and eNBs 112 in a manner similar to that described in relation to FIGS. 4-7 and elsewhere in this description. For example, with respect to FIG. 4 and the traffic volume as a parameter, this method may be implemented for picocells 810, microcells 820, and eNBs 112. With respect to FIG. 5 and the class parameter, this method may be implemented for picocells 810 and microcells 820. For example, picocells 810 and/or microcells 820 may be of different classes, as previously described, or kind (e.g., indoor versus outdoor). With respect to FIG. 6 and the received signal strength parameter, this method may be implemented for picocells 810 and microcells 820. With respect to FIG. 7 and the randomization approach, this method may be implemented by picocells 810, microcells 820, and eNBs 112. Depending on the circumstances of the event (e.g., a power outage, etc), the impact on the number of wireless nodes (e.g., eNB 112, picocell 810, microcell 820, etc.) may vary since the coverage area of each type of wireless node can be vastly differently, and consequently, the potential for congestion.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

In addition, while series of blocks are described with regard to the processes illustrated in FIGS. 3-7, the order of the blocks may be modified in other implementations. Further, non-dependent blocks may be performed in parallel. Additionally, with respect to other processes described in this description, the order of operations may be different according to other implementations, and/or operations may be performed in parallel.

The embodiments described herein may be implemented in many different forms of software and/or firmware executed by hardware. For example, a process or a function may be implemented as "logic" or as a "component." The logic or the component may include, for example, hardware (e.g., processor 205, etc.), or a combination of hardware and software (e.g., software 215). The embodiments have been described without reference to the specific software code since software can be designed to implement the embodiments based on the description herein.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded as illustrative rather than restrictive.

In the specification and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

Additionally, embodiments described herein may be implemented as a non-transitory storage medium that stores data and/or information, such as instructions, program code, data structures, program modules, an application, etc. The program code, instructions, application, etc., is readable and executable by a processor (e.g., processor 205) of a computational device. A non-transitory storage medium includes one or more of the storage mediums described in relation to memory/storage 210.

No element, act, operation, or instruction described in the present application should be construed as critical or essential to the embodiments described herein unless explicitly described as such.

What is claimed is:

1. A method comprising:
   obtaining, by a network device, a traffic volume value that indicates a volume of traffic to and/or from a radio node, a value that indicates a class of the radio node, or a received signal strength value that indicates a received signal strength of a macro signal received by the radio node;
   calculating, by the network device, a delay time value based on the traffic volume value, the value that indicates the class, or the received signal strength value; and
   transmitting, by the network device, the delay time value to the radio node, wherein the delay time value indicates a time period to wait, by the radio node, before attempting to authenticate and register with one or more network devices, wherein when the value that indicates the class of the radio node is obtained, the method further comprises:
      calculating a random number k based on a number of failed attempts by the radio node to authenticate and register; and
      multiplying the random number k and a default time period t, wherein the default time period t is based on the class of the radio node.

2. The method of claim 1, wherein when the traffic volume value is obtained, the method further comprises:
   comparing the traffic volume value to one or more threshold traffic volume values; and
   selecting the delay time value based on the comparing.

3. The method of claim 1, wherein when the radio node is unable to authenticate and register with the one or more network devices based on the delay time value that is calculated using one of the traffic volume value, the value that indicates the class or the received signal strength value, the method further comprises:
   calculating another delay time value using a different one of the traffic volume value, the value that indicates the class or the received signal strength value; and
   transmitting the other delay time value to the radio node.

4. The method of claim 1, wherein the value that indicates the class corresponds to one of a residential class, a small enterprise class, a medium enterprise class, or a large enterprise class, and wherein each of the residential class, the small enterprise class, the medium enterprise class, and the large enterprise class has a unique default time period t.

5. The method of claim 4, further comprising:
   adding a time period T to a product of multiplying the random number k and the default time period t to calculate the delay time value, wherein the time period T is based on the class of the radio node.

6. The method of claim 1, further comprising:
   using, by the radio node, the delay time value after an event occurs, wherein the event is one of a user-invoked power shutdown or a power outage, and wherein the radio node is one of a femtocell, a picocell, or a microcell.

7. The method of claim 1, wherein when the received signal strength value is obtained, the method further comprises:
   comparing the received signal strength value to one or more threshold power values; and
   selecting the delay time value based on the comparing.

8. A device comprising:
   a communication interface;
   a memory, wherein the memory stores instructions; and
   a processor, wherein the processor executes the instructions to:
      obtain a traffic volume value that indicates a volume of traffic from a radio node, a value that indicates a class of the radio node, or a received signal strength value that indicates a received signal strength of a macro signal received by the radio node;
      calculate a delay time value based on the traffic volume value, the value that indicates the class, or the received signal strength value; and
      transmit, via the communication interface, the delay time value to the radio node, wherein the delay time value indicates a time period to wait, by the radio node, before attempting to authenticate and register with one or more network devices, wherein when the value that indicates the class of the radio node is obtained, the processor further executes the instructions to:
   calculate a random number k based on a number of failed attempts by the radio node to authenticate and register; and
   multiply the random number k and a default time period t, wherein the default time period t is based on the class of the radio node.

9. The device of claim 8, wherein when the traffic volume value is obtained, the processor further executes the instructions to:
   compare the traffic volume value to one or more threshold traffic volume values; and
   select the delay time value based on a comparison between the traffic volume value and the one or more threshold traffic volume values.

10. The device of claim 9, wherein when the radio node is unable to authenticate and register with the one or more network devices based on the delay time value that is calculated using one of the traffic volume value, the value that indicates the class or the received signal strength value, the processor further executes the instructions to:
    calculate another delay time value using a different one of the traffic volume value, the value that indicates the class or the received signal strength value; and
    transmit, via the communication interface, the other delay time value to the radio node.

11. The device of claim 8, wherein the value that indicates the class corresponds to one of a residential class, a small enterprise class, a medium enterprise class, or a large enterprise class, and wherein each of the residential class, the small enterprise class, the medium enterprise class, and the large enterprise class has a unique default time period t.

12. The device of claim 11, wherein the processor further executes the instructions to:
    add a time period T to a product of a multiplication of the random number k and a default time period t to calculate the delay time value, wherein the time period T is based on the class of the radio node.

13. The device of claim 12, wherein the time period T for the large enterprise class is shorter than the time period T for the residential class.

14. The device of claim 8, wherein when the received signal strength value is obtained, the processor further executes the instructions to:
    compare the received signal strength value to one or more threshold power values; and select the delay time value based on a comparison between the received signal strength value and the one or more threshold power values.

15. The device of claim 8, wherein the device is a femtocell gateway or a femtocell management system device, and wherein the radio node is one of a femtocell, a picocell, or a microcell.

16. A non-transitory storage medium comprising instructions executable by a processor of a computational device, which when executed by the processor, cause the computational device to:
  obtain a traffic volume value that indicates a volume of traffic from a radio node, a value that indicates a class of the radio node, or a received signal strength value that indicates a received signal strength of a macro signal received by the radio node;
  calculate a delay time value based on the traffic volume value, the value that indicates the class, or the received signal strength value; and
  transmit the delay time value to the radio node, wherein the delay time value indicates a time period to wait, by the radio node, before attempting to authenticate and register with one or more network devices, wherein when the value that indicates the class of the radio node is obtained, the instructions, which when executed by the processor, cause the computational device to:
  calculate a random number k based on a number of failed attempts by the radio node to authenticate and register; and
  multiply the random number k and a default time period t, wherein the default time period t is based on the class of the radio node.

17. The non-transitory storage medium of claim 16, wherein when the traffic volume value is obtained, the instructions, which when executed by the processor, cause the computational device to:
  compare the traffic volume value to one or more threshold traffic volume values; and
  select the delay time value based on a comparison between the traffic volume value and the one or more threshold traffic volume values.

18. The non-transitory storage medium of claim 17, wherein when the radio node is unable to authenticate and register with the one or more network devices based on the delay time value that is calculated using one of the traffic volume value, the value that indicates the class or the received signal strength value, the instructions, which when executed by the processor, cause the computational device to:
  calculate another delay time value using a different one of the traffic volume value, the value that indicates the class or the received signal strength value; and
  transmit the other delay time value to the radio node.

19. The non-transitory storage medium of claim 16, wherein the instructions, which when executed by the processor, cause the computational device to:
  add a time period T to a product of a multiplication between the random number k and the default time period t to calculate the delay time value, wherein the time period T is based on the class of the radio node.

20. The non-transitory storage medium of claim 16, wherein when the received signal strength value is obtained, the instructions, which when executed by the processor, cause the computational device to:
  compare the received signal strength value to one or more threshold power values; and
  select the delay time value based on a comparison between the received signal strength value and the one or more threshold power values.

21. A method comprising:
  powering up, by a radio node, subsequent to a power shutdown;
  determining, by the radio node, whether the power shutdown was unexpected;
  selecting, by the radio node, a congestion control method based on determining that the power shutdown was unexpected; and
  calculating, by the radio node, a delay time value, wherein the delay time value indicates a time period to wait before attempting to authenticate or register with one or more network devices, wherein the calculating comprises:
    calculating a random number k based on a number of failed attempts by the radio node to authenticate and register; and
    multiplying the random number k and a default time period t, wherein a product of k and t is the delay time value.

22. The method of claim 21, wherein the radio node is one of a femtocell, a picocell, a microcell, or a macrocell, and wherein the method further comprises:
  waiting, by the radio node, the time period corresponding to the delay time value, before attempting to authenticate or register with the one or more network devices; and
  transmitting, by the radio node, upon expiration of the time period, a request to authenticate or register with the one or more network devices.

23. The method of claim 21, wherein k is a random number between $2^h-1$ and 0, and h is the number of failed attempts.

24. The method of claim 21, wherein the determining comprises:
  determining that the power shutdown was a result of a power outage or a user-invoked power shutdown.

25. The method of claim 21, further comprising:
  selecting another congestion control method based on a value that indicates a limit to a number of failed attempts.

* * * * *